(12) United States Patent
Lee, Jr. et al.

(10) Patent No.: US 6,571,885 B2
(45) Date of Patent: Jun. 3, 2003

(54) SURVEY FLAG POSITIONING METHOD AND APPARATUS

(75) Inventors: Landris Thomas Lee, Jr., Vicksborg, MS (US); Philip Garcin Malone, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 127 days.

(21) Appl. No.: 09/779,051

(22) Filed: Feb. 8, 2001

(65) Prior Publication Data

US 2002/0104664 A1 Aug. 8, 2002

(51) Int. Cl.[7] ................................................. E21B 7/00
(52) U.S. Cl. ............................... 173/1; 173/30; 173/90; 405/232
(58) Field of Search ............................... 173/1, 91, 90, 173/30; 227/147; 405/232

(56) References Cited

U.S. PATENT DOCUMENTS

| 1,965,177 | A | * | 7/1934 | Finkl | 97/58 |
|---|---|---|---|---|---|
| 2,525,316 | A | * | 10/1950 | Schiff | 61/73 |
| 4,268,926 | A | * | 5/1981 | Roxton | 30/367 |
| 4,520,985 | A | | 6/1985 | Blumenthal | 248/530 |
| 4,589,661 | A | | 5/1986 | Attig | 273/32.5 |
| 4,627,563 | A | * | 12/1986 | Meyer | 227/120 |
| 4,706,864 | A | * | 11/1987 | Jacobsen et al. | 227/109 |
| 4,826,066 | A | | 5/1989 | Koester et al. | 227/120 |
| 4,850,437 | A | * | 7/1989 | Sudnishnikov et al. | 173/13 |
| 5,020,605 | A | * | 6/1991 | Leishman | 173/1 |
| 5,042,591 | A | * | 8/1991 | Hull | 173/132 |
| 5,085,281 | A | * | 2/1992 | Selly | 173/128 |
| 5,247,900 | A | | 9/1993 | Sobczak | 116/209 |
| 5,542,479 | A | * | 8/1996 | Stachler et al. | 173/126 |
| 5,671,814 | A | | 9/1997 | Smith | 173/91 |
| 5,718,646 | A | | 2/1998 | Brewer | 473/386 |
| 5,819,857 | A | * | 10/1998 | Rohrer | 173/128 |
| 5,918,565 | A | * | 7/1999 | Casas | 116/209 |
| 5,988,296 | A | | 11/1999 | Zachman et al. | 173/1 |
| 6,053,260 | A | * | 4/2000 | Boon et al. | 173/1 |

* cited by examiner

Primary Examiner—Rinaldi I. Rada
Assistant Examiner—Louis Tran
(74) Attorney, Agent, or Firm—Earl H. Baugher, Jr.; John MacEvoy

(57) ABSTRACT

A device for placing survey flags, and similar devices having stems, is operated so that the stem is locked or otherwise held to an elongated shaft or similar aligning device. Pressure on the shaft or aligning device forces a portion of the flag stem into the soil or other sound substrate. Then, an operator can carry out an operation to separate the placing device from the stem.

3 Claims, 2 Drawing Sheets

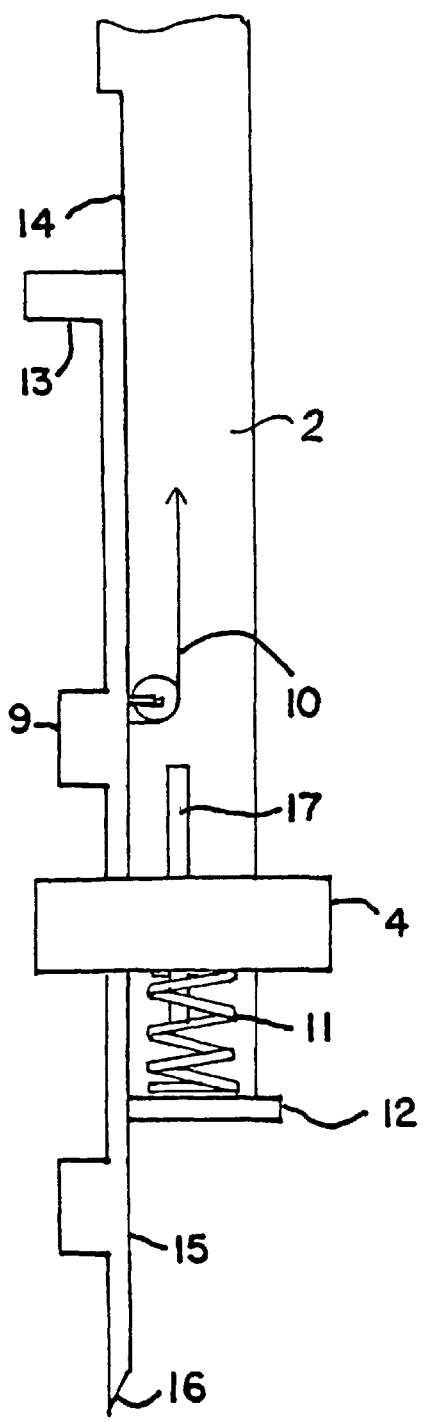
FIG. 2a
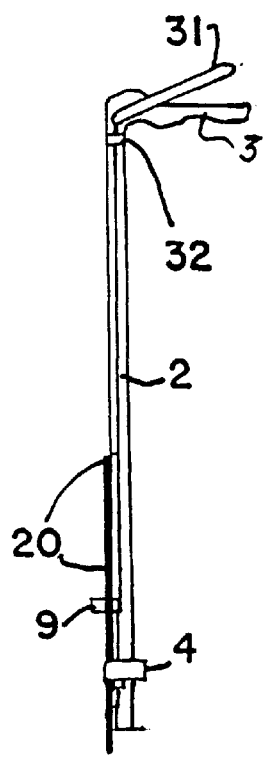
FIG. 2b
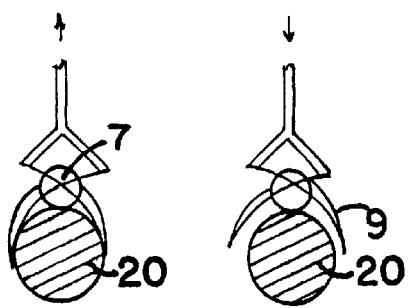
FIG. 2c   FIG. 2d

SURVEY FLAG POSITIONING METHOD AND APPARATUS

TECHNICAL FIELD

The present invention is generally related to the use of survey flags for marking locations. In particular, the present invention is directed to an improved survey flag placement apparatus and method for using the apparatus.

BACKGROUND ART

Survey flags are necessary for marking locations, grid patterns, or boundaries. The conventional method of placing survey marker flags for geophysical or topographical surveys consist of firmly grasping the flag stem, bending over and forcing the flag into the ground. Care must be taken not to bend the flag stem. Consequently, the overall flag placement process is slowed, and often extremely tedious, especially if the ground or soil is extremely hard or dense.

When marking boundaries, this manual process must be repeated numerous times, depending upon the size of the survey area. This traditional method has been considered standard in any surveying or boundary-marking system, and has not been improved upon or modified to any significant degree.

The benefits of the conventional system are readily apparent; the conventional survey marker flag installation method does not require any equipment besides the survey flags themselves. The operator provides the physical means to position the flags. The overall operation is simple, inexpensive, and under optimal circumstances quickly carried out.

Unfortunately, the installation of each flag requires that the operator bend over and stab the flag into the soil by hand. Repetitive bending causes muscle strains, especially lower backaches. Further, the placement of the flags in tall weeds increases the exposure to poison ivy and snake bites in the lower arm and hands. When stabbing the flag stem into hard or compacted soils, extra effort is necessary, thereby reducing efficiency and increasing fatigue.

Accordingly, there is a definite need for an improved method of positioning or placing survey marker flags that overcomes drawbacks of conventional techniques.

SUMMARY OF THE INVENTION

Accordingly, it is an object of the present invention to overcome all of the drawbacks of conventional flag setting devices and techniques.

It is another object of the present invention to eliminate physical bending when placing survey flag markers, or any object having an elongated stem.

It is a further object of the present invention to eliminate extensive hand contact when placing survey flag markers.

It is an additional object of the present invention to provide two placement options when placing survey flag markers, depending upon the density of the soil.

It yet another object of the present invention to provide a survey flag placement device that works with either metal or non-metal survey flags.

It is still a further object of the present invention to provide a survey flag placement system in which bending of flag stems is avoided.

It is yet an additional object of the present invention to provide a survey flag placement device that also serves as a walking aid and defensive weapon when not being used for setting survey flags.

It is again another object of the present invention to provide a survey flag setting device that grips and releases a survey flag stem using a convenient spring-aided hand control.

It is yet a further object of the present invention to provide a survey flag setting device that is capable of handling a wide variety of flag stem sizes.

It is yet a further object of the present invention to provide a flag placement system whereby the flag placement device is easily separated from the flag once the flag has been inserted into the ground or another substrate.

These and other objects and goals of the present invention are achieved by a stem-placing apparatus including a shaft having a ground end and an upper end. The placing apparatus also includes an elongated stem aligning device, and a holding device arranged to releaseably hold the stem in alignment with the aligning device. Also included is a foot push piece located proximate the ground end of the shaft and extending substantially perpendicular to the shaft.

In a further embodiment a method of placing a stem into a substrate is carried out by operating a placing device having an elongated shaft and a device for holding the stem to the shaft. The method includes the steps of aligning the stem along the shaft and locking the stem to the shaft. Then the shaft is pushed against the substrate to push a portion of the stem into the substrate. A locking mechanism is operated to release the stem from the shaft. Finally, the placing device is removed from the stem.

BRIEF DESCRIPTION OF THE DRAWINGS

FIG. 2(a) is a side view depicting the details of a flag guide mounted on the distal end of the flag placement device.

FIG. 2(b) is an overall side view of the present invention, holding a survey flag.

FIG. 2(c) is a top cross-sectional view of the flag placement device of the present invention positioned to hold a survey flag shaft.

FIG. 2(d) is a top cross-sectional view of the flag placement device of the present invention, positioned to release a survey flag shaft.

DETAILED DESCRIPTION OF THE PREFERRED EMBODIMENTS

Figure 1A:
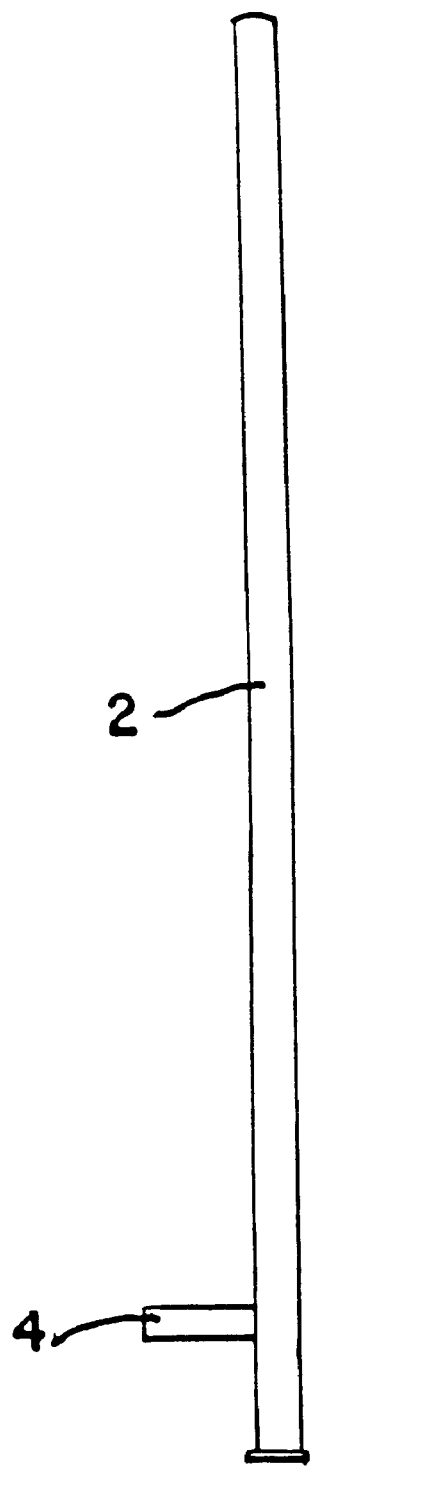
FIG. 1(a) is a front view of one embodiment of the present invention, depicting the location of the foot pushing device.
Figure 1B:
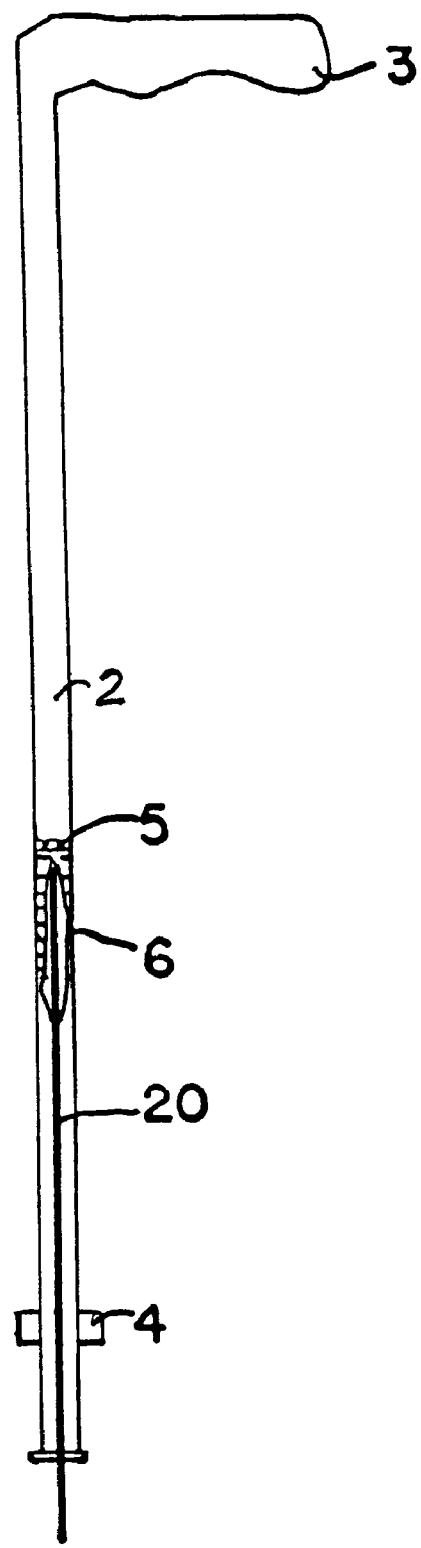
FIG. 1(b) is a side view of the device depicted in FIG. 1(a), depicting the control handle and the placement of a survey flag within the shaft of the device.

FIGS. 1(a) and 1(b) are front and side views, respectively, of a first embodiment of the present invention. The flag placement device depicted in the drawings is constituted by an elongated shaft 2, which is hollow. At the top end of the shaft a hand handle 3 extends roughly perpendicular to the shaft. Near the ground or bottom end of the shaft, a foot-push piece 4 extends approximately perpendicular to the elongated shaft.

In operation, a survey flag 20, or other object having an elongated stem, is placed within the hollow shaft 2 as depicted in FIG. 1(b). The bottom portion or tip of the flag stem extends beyond the bottom of the shaft 2. The top of the flag is held by a constraint or holding device 6 within the interior of hollow shaft 2. This constraint is preferably foam for the embodiment depicted in FIGS. 1(a), 1(b), and is arranged so that flag 20 is easily released. An operator holds the apparatus by handle 3 and thrusts downward forcing the tip of the stem of the flag 20 into the ground. A stop 5 prevents the survey flag 20 from moving further upwards within the hollow shaft 2 so that the force provided by the operator serves to drive the tip of flag 20 stem into the ground or other substrate material. After thrusting the tip of the flag stem into the ground, the operator merely pulls up on shaft 2 using handle 3. As a result, the flag 20 is stuck in the ground and freed from shaft 2.

Should the operator have difficulty placing the tip of flag 20 into the ground with just the use of a hand on handle 3, additional force can be applied by way of foot-push piece 4. While holding handle 3, the operator need only to place his or her foot on foot push piece 4 and thrust downward. Since the foot push piece 4 extends substantially perpendicular from shaft 2, the placement of the operators foot and accompanying weight will easily drive the tip of the flag into even extremely dense or hard soil. The operator need not bend over or otherwise place his or her hands proximate the ground soil or other substrate. Because the operator is standing upright while using the elongated vertical shaft, accurate placement of the survey flags becomes far easier than if the operator were bending over. Because accurate placement becomes relatively easy and fatigue-free, the efficiency of the overall surveying operation is greatly increased.

The Areloading@ operation is also extremely easy since the operator need only reverse the shaft and slide another flag into hollow shaft 2 until the top of the flag reaches stop 5. The shaft is then reversed, the operator grasps handle 3 and the next flag can be placed into the ground. The operator need never bend over, or expose his or her hands to flora and fauna residing near the surface of the soil. Back strain is eliminated since all of the additional force is applied using the weight of the operator on foot-push piece 4.

FIGS. 2(a)-2(d) depict a more elaborate embodiment of the present invention. In this arrangement, flag 20 is held outside of shaft 2 by means of a holding device 9 and an aligning structure 15 (as depicted in FIG. 2(a)). The flag or other device having a stem, is aligned with aligning structure 15, and held thereto by holding device 9. As with the previous embodiment of FIGS. 1(a), 1(b), the tip of the flag stem can extend below the bottom of shaft 2 so that it may be more easily forced into the soil or other substrate.

In the FIG. 2(a) embodiment, the stem of the flag is aided by being aligned with a stabbing device 16, which is part of the overall aligning structure 15. The flag is prevented from moving vertically when being thrust into the ground, by a stop 13. This stop device works very much like stop 5 in the FIG. 1(b) embodiment.

The holding device 9 consists of two arms as depicted in FIGS. 2(c) and 2(d). The arms are operated at pivot 7. The arms are open and closed by control handle 31, which is pivoted on handle 3. Control handle 31 can be biased by spring 32 to better carry out quick and efficient operation of the holding device 9. Movement of control handle 31 is transmitted to holding device 9 by means of control wire 10, which extends through the interior of hollow shaft 2. Control wire 10 moves holding device 9 about pivot 7 in a conventional manner, and is likewise arranged through hollow shaft 2 in a conventional manner.

It is the use of a spring-bias control that constitutes another point of novelty in this field of endeavor. In operation, the flag 20 is placed along aligning device 15 with the top of the flag abutting stop 13. The operator then grasps control handle 31 to hold the flag against the alignment device 15. The operator can then, using only one hand, thrust the stabbing device and the tip of the flag into the ground. Upon releasing control handle 31, the holding device releases the flag stem. With the help of bias from spring 32, the shaft 2 can be withdrawn while the flag remains in the ground.

Should additional force be needed, the operator can resort to the use of foot-push piece 4. Even if a great deal of force is applied to both the shaft and the foot-push piece, there is little chance of damaging the stem of even a fragile metal survey flag because on the support provided by the stabbing device 16. Since the alignment piece 15 is arranged as an elongated structure, it supports the flag shaft or stem along its entire length while being thrust into the ground. As a result, virtually any type of material can be used for the flag shaft or stem, including plastic, ductile metal, wood, or even brittle materials. Accordingly, it is not necessary to have a metal stem with a plastic flag. Rather, the whole flag can be plastic. In the alternative, wires that are normally too thin to be used with conventional survey flag placement techniques and devices, can be used with the present invention.

In extremely dense soils, there may be problem in removing the stabbing device 16 of the aligning structure 15. This is addressed by an auxiliary structure (as depicted in FIG. 2(a)) in which the aligning structure 15 is placed into a slot 14 on the shaft 2 to form a slide. The aligning structure is attached to foot-push piece 4, which is arranged to move vertically along shaft 2 by virtue of slot 17. Accordingly, both the foot push piece 4 and alignment device 15 move as one piece for a short distance along shaft 2. In operation, the operator will apply his or her foot to foot-push piece 4 in order to drive stabbing device 16 (along with the tip of the flag shaft) into the ground. Penetration of both the stabbing device 16 and the flag shaft will extend only as far as the foot push-piece 4 can be forced towards ground plate 12. In the optimum flag placement position, ground plate 12 is forced against the ground for flag placement while foot-push piece 4 is moved as close to ground plate 12 as permitted by slide 17 and bias spring 11.

It is the use of the bias spring 11 that helps remove the stabbing piece 16 quickly and efficiently from the ground once flag 20 has been released from holding device 9 by releasing control handle 31. As a result of this spring-aided release of stabbing device 16, the operator is not forced to exert extensive force in placing the flag 20 or removing any portion of the stabbing piece 16. The whole operation can be carried out while the operator is in an upright position so that the operator can concentrate on the exact placement of the flag rather than on the mechanics of putting the flag into the ground and retrieving placement device afterwards.

The use of biasing spring 11 which forces the foot-piece 4 and the stabbing piece 16 upward along shaft 2 in slot 4, also serves as a safety device by allowing withdrawal of stabbing device 16 so that it does not extend beyond ground plate 12 unless so desired by the operator. The placing device can be adjusted, either at the factory or by the operator so that the placement of stabbing piece 16, when withdrawn by the force of biasing spring 11, can be located as desired.

Because elongated shaft 2 is long enough to allow an operator to place flags without bending over, the shaft can also be used as a walking stick, or even a defensive weapon. The placing device can be made of metal, plastic, wood, rubber or any combination thereof. Because of the size of the placing apparatus, a wide variety of survey marking flags and other devices having stems can be accommodated without undue stress of the operator.

While a number of preferred embodiments have been presented by way of example, the present invention is not limited thereby. Rather, the present invention is to be construed as including any an all variations, modifications, adaptations, permutations, and other embodiments that would occur to one skilled in this art, once having been taught the present invention. Accordingly, the present invention is to be considered as being limited only by the following claims.

We claim:

1. A stem placing apparatus comprising:
    a hollow shaft having a ground-contacting end and an upper end;
    an elongated stem alignment device arranged exterior to said shaft,
  wherein said alignment device is extendable beyond said ground-contacting end of said shaft;
    a holding device incorporating a pivot,
  wherein said holding device is arranged externally to said shaft to releaseably hold said stem in alignment with said alignment device;
    a foot-push piece proximate said ground-contacting end of said shaft and extending substantially perpendicular thereto;
    a handle located at said upper end of said shaft;
    a pivoting control piece proximate said handle; and
    a wire in operable communication with said pivoting control piece,
  wherein said pivot is actuated by operation of said control piece to move said wire.

2. The stem placing device of claim 1, in which said wire extends through said shaft from said upper end to a position proximate said ground-contacting end.

3. The stem placing apparatus of claim 2, further comprising a spring by which said pivoting control piece is biased.

* * * * *